UNITED STATES PATENT OFFICE.

AUGUST F. W. PARTZ, OF PHILADELPHIA, PENNSYLVANIA.

LIQUID FOR VOLTAIC BATTERIES.

SPECIFICATION forming part of Letters Patent No. 328,607, dated October 20, 1885.

Application filed October 6, 1884. Serial No. 144,859. (No specimens.)

*To all whom it may concern:*

Be it known that I, AUGUST F. W. PARTZ, a citizen of the United States, residing at Philadelphia, in the State of Pennsylvania, have invented a certain Improvement in Liquids for Voltaic Batteries, of which the following is a full and exact description.

This invention relates to an excitant liquid or electrolyte which is intended to take the place of the one described in my Patent No. 252,619, January 24, 1882, in cases in which the use of bichromate of ammonia is objectionable on account of its comparatively high cost.

The invention consists in the employment in a voltaic element of a compound solution of chloride of ammonium and bichromate of potash in combination with an anode of zinc and a cathode of carbon. The electric current of an element of this kind, with a solution of about twenty parts of chloride of ammonium and ten parts of bichromate of potash in one-hundred parts of water, is nearly equal to that of a similar element with a solution of chloride of zinc and bichromate of ammonia; but as the latter salt is far more soluble than bichromate of potash, a battery containing the potash salt requires oftener to be replenished.

Though the aforesaid compound solution may be employed in batteries of different forms having electrodes of zinc and carbon, I prefer for it elements made on the plan shown and described in the above named patent—that is to say, with slotted carbon cathodes, which may be in the shape either of hollow cylinders or of slabs or plates.

I claim as my invention—

The combination, in a voltaic element, of a compound solution of chloride of ammonium and bichromate of potash with an anode of zinc and a cathode of carbon.

AUGUST F. W. PARTZ.

Witnesses:
 J. L. PARTZ,
 GEORGE BOND.